(12) United States Patent
Kanke et al.

(10) Patent No.: US 7,285,310 B2
(45) Date of Patent: Oct. 23, 2007

(54) ACTIVE ENERGY RAY CURABLE AQUEOUS INK, AND INK-JET RECORDING PROCESS, INK CARTRIDGE, RECORDING UNIT AND INK-JET RECORDING APPARATUS USING THE SAME

(75) Inventors: Tsuyoshi Kanke, Kawasaki (JP); Hiromitsu Kishi, Yokohama (JP); Hiromichi Noguchi, Tokyo (JP); Yutaka Kurabayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 11/218,509

(22) Filed: Sep. 6, 2005

(65) Prior Publication Data

US 2005/0288384 A1 Dec. 29, 2005

Related U.S. Application Data

(63) Continuation of application No. PCT/JP2005/006425, filed on Mar. 25, 2005.

(30) Foreign Application Priority Data

Mar. 26, 2004 (JP) ............................. 2004-092370

(51) Int. Cl.
*B41J 2/01* (2006.01)
*B05D 1/32* (2006.01)
*C09D 11/10* (2006.01)

(52) U.S. Cl. .................... 427/466; 522/42; 522/44; 522/53; 522/64; 522/84; 522/75

(58) Field of Classification Search ............... 522/84, 522/42, 53, 64, 75, 44; 523/160; 524/827; 427/466
See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 4,978,969 A | 12/1990 | Chieng | 346/1.1 |
| 5,043,747 A | 8/1991 | Ebisawa et al. | 346/140 |
| 5,081,470 A | 1/1992 | Kurabayashi et al. | 346/1.1 |
| 5,124,201 A | 6/1992 | Kurabayashi et al. | 428/323 |
| 5,137,778 A | 8/1992 | Nakatsugawa et al. | 428/330 |
| 5,150,132 A | 9/1992 | Shimomura et al. | 346/140 R |
| 5,160,370 A | 11/1992 | Suga et al. | 106/20 |
| 5,171,626 A | 12/1992 | Nagamine et al. | 428/212 |
| 5,172,133 A | 12/1992 | Suga et al. | 346/1.1 |
| 5,229,786 A | 7/1993 | Suga et al. | 346/1.1 |
| 5,246,774 A | 9/1993 | Sakaki et al. | 428/323 |
| 5,277,962 A | 1/1994 | Nakatsugawa et al. | 428/206 |
| 5,354,369 A | 10/1994 | Shimomura et al. | 106/22 H |
| 5,362,558 A | 11/1994 | Sakaki et al. | 428/323 |
| 5,409,529 A | 4/1995 | Nagashima et al. | 106/22 H |
| 5,415,686 A | 5/1995 | Kuragayashi et al. | 106/26 R |
| 5,439,515 A | 8/1995 | Kurabayashi et al. | 106/20 R |
| 5,526,031 A | 6/1996 | Kurabayashi | 347/105 R |
| 5,549,740 A | 8/1996 | Takahashi et al. | 106/20 R |
| 5,606,356 A | 2/1997 | Noguchi et al. | 347/100 |
| 5,614,007 A | 3/1997 | Kurabayashi et al. | 106/22 R |
| 5,618,338 A | 4/1997 | Kurabayashi et al. | 106/26 R |

(Continued)

FOREIGN PATENT DOCUMENTS

JP 59-123670 7/1984

(Continued)

OTHER PUBLICATIONS

JPO website machine translation of JP 2002-187918, Jul. 2002.*

(Continued)

*Primary Examiner*—Susan W. Berman
(74) *Attorney, Agent, or Firm*—Fitzpatrick, Cella, Harper & Scinto

(57) ABSTRACT

An active energy ray curable ink which is quickly polymerized by an active energy ray, high in crosslinking degree of a cured material formed, excellent in adhesive property, low in viscosity, excellent in long-term storability and also excellent in ejection stability, and an ink-jet recording process, an ink cartridge, a recording unit and an ink-jet recording apparatus using such an ink are provided. In the active energy ray curable aqueous ink comprising at least water and a polymerizable material which is radically polymerized by an active energy ray, the polymerizable material is a water-soluble polymerizable material represented by the following general formula (I). An ink-jet recording process, an ink cartridge, a recording unit and an ink-jet recording apparatus using such an ink (I)

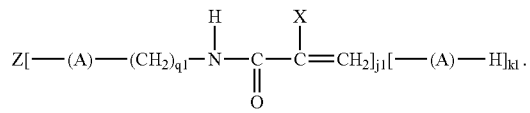

6 Claims, 1 Drawing Sheet

U.S. PATENT DOCUMENTS

| | | | |
|---|---|---|---|
| 5,623,294 A | 4/1997 | Takizawa et al. | 347/98 |
| 5,624,484 A | 4/1997 | Takahashi et al. | 106/31.75 |
| 5,651,814 A | 7/1997 | Shimomura et al. | 106/31.36 |
| 5,658,376 A | 8/1997 | Noguchi et al. | 106/31.43 |
| 5,681,643 A | 10/1997 | Noguchi et al. | 428/195 |
| 5,686,508 A | 11/1997 | Shimomura et al. | 523/161 |
| 5,696,182 A | 12/1997 | Kashiwazaki et al. | 523/161 |
| 5,700,314 A | 12/1997 | Kurabayashi et al. | 106/31.27 |
| 5,733,363 A | 3/1998 | Nagashima et al. | 106/31.43 |
| 5,734,403 A | 3/1998 | Suga et al. | 347/101 |
| 5,792,249 A | 8/1998 | Shirota et al. | 106/31.27 |
| 5,835,116 A | 11/1998 | Sato et al. | 347/98 |
| 5,849,815 A | 12/1998 | Aoki et al. | 523/161 |
| 5,851,280 A | 12/1998 | Belmont et al. | 106/472 |
| 5,861,194 A | 1/1999 | Noguchi et al. | 427/386 |
| 5,866,638 A | 2/1999 | Shimomura et al. | 523/16 |
| 5,952,401 A | 9/1999 | Kimura et al. | 523/161 |
| 5,952,414 A | 9/1999 | Noguchi et al. | 524/377 |
| 5,954,906 A | 9/1999 | Abe et al. | 156/247 |
| 5,985,975 A | 11/1999 | Kurabayashi et al. | 524/462 |
| 6,001,466 A | 12/1999 | Noguchi et al. | 428/327 |
| 6,027,210 A | 2/2000 | Kurabayashi et al. | 347/100 |
| 6,056,811 A | 5/2000 | Shimomura et al. | 106/31.36 |
| 6,076,919 A | 6/2000 | Shirota et al. | 347/60 |
| 6,143,363 A | 11/2000 | Noguchi et al. | 427/261 |
| 6,214,963 B1 | 4/2001 | Noguchi et al. | 528/71 |
| 6,238,045 B1 | 5/2001 | Ono et al. | 347/96 |
| 6,322,209 B1 | 11/2001 | Sato et al. | 347/105 |
| 6,341,855 B1 | 1/2002 | Kurabayash | 347/100 |
| 6,342,096 B1 | 1/2002 | Kurabayashi | 106/31.27 |
| 6,344,526 B1 | 2/2002 | Noguchi et al. | 525/527 |
| 6,354,698 B1 | 3/2002 | Tachihara et al. | 347/56 |
| 6,367,921 B1 | 4/2002 | Kurabayashi et al. | 347/101 |
| 6,391,947 B1 | 5/2002 | Noguchi et al. | 524/84 |
| 6,398,355 B1 | 6/2002 | Shirota et al. | 347/100 |
| 6,399,674 B1 | 6/2002 | Kashiwazaki et al. | 523/161 |
| 6,412,936 B1 | 7/2002 | Mafune et al. | 347/100 |
| 6,428,862 B1 * | 8/2002 | Noguchi | 427/511 |
| 6,448,346 B1 | 9/2002 | Noguchi et al. | 525/527 |
| 6,460,988 B1 | 10/2002 | Mafune et al. | 347/100 |
| 6,460,989 B1 | 10/2002 | Yano et al. | 347/101 |
| 6,471,757 B1 | 10/2002 | Koitabashi et al. | 106/31.28 |
| 6,472,129 B2 | 10/2002 | Noguchi et al. | 430/326 |
| 6,500,875 B2 | 12/2002 | Noguchi | 522/42 |
| 6,503,307 B1 | 1/2003 | Noguchi | 106/31.27 |
| 6,517,199 B1 | 2/2003 | Tomioka et al. | 347/101 |
| 6,521,323 B1 | 2/2003 | Sakaki et al. | 428/195 |
| 6,536,890 B1 | 3/2003 | Kato et al. | 347/100 |
| 6,552,156 B2 | 4/2003 | Noguchi et al. | 528/71 |
| 6,702,882 B2 | 3/2004 | Yakushigawa et al. | 106/31.27 |
| 6,706,100 B2 | 3/2004 | Mafune et al. | 106/31.27 |
| 6,706,104 B2 | 3/2004 | Takuhara et al. | 106/31.6 |
| 6,719,420 B2 | 4/2004 | Tomioka et al. | 347/100 |
| 6,746,114 B2 | 6/2004 | Takahashi et al. | 347/100 |
| 6,761,431 B2 | 7/2004 | Noguchi et al. | 347/45 |
| 6,780,901 B1 | 8/2004 | Endo et al. | 523/160 |
| 6,790,875 B2 * | 9/2004 | Noguchi et al. | 522/84 |
| 6,790,878 B2 | 9/2004 | Kurabayashi | 523/160 |
| 6,794,427 B2 | 9/2004 | Kurabayashi et al. | 523/161 |
| 6,821,328 B2 | 11/2004 | Tomioka et al. | 106/31.33 |
| 6,843,839 B2 | 1/2005 | Kanke et al. | 106/31.47 |
| 6,863,392 B2 | 3/2005 | Shimomura et al. | 347/100 |
| 6,866,380 B2 | 3/2005 | Yakushigawa et al. | 347/100 |
| 6,966,944 B2 | 11/2005 | Shimomura et al. | 106/31.43 |
| 7,025,817 B2 | 4/2006 | Kanke et al. | 106/31.51 |
| 2004/0074418 A1 | 4/2004 | Mafune et al. | 106/31.27 |
| 2005/0005818 A1 | 1/2005 | Sato et al. | 106/31.27 |
| 2005/0284332 A1 | 12/2005 | Shinjo et al. | 106/31.27 |
| 2005/0288384 A1 | 12/2005 | Kanke et al. | 522/6 |
| 2006/0000386 A1 | 1/2006 | Hakamada et al. | 106/31.13 |
| 2006/0004116 A1 | 1/2006 | Kishi et al. | 522/146 |
| 2006/0007289 A1 | 1/2006 | Nito et al. | 347/100 |

FOREIGN PATENT DOCUMENTS

| | | |
|---|---|---|
| JP | 5-247392 | 9/1993 |
| JP | 8-143802 | 6/1996 |
| JP | 8-165441 | 6/1996 |
| JP | 8-209048 | 8/1996 |
| JP | 8-218018 | 8/1996 |
| JP | 9-31360 | 2/1997 |
| JP | 9-104834 | 4/1997 |
| JP | 9-151342 | 6/1997 |
| JP | 9-316353 | 12/1997 |
| JP | 10-140065 | 5/1998 |
| JP | 11-188870 | 7/1999 |
| JP | 2962880 B2 | 10/1999 |
| JP | 2000-117960 | 4/2000 |
| JP | 3246949 B2 | 1/2002 |
| JP | 2002-187918 | 7/2002 |
| JP | 2004-323753 | 11/2004 |

OTHER PUBLICATIONS

JPO websire machine translation of JP 2004-323753, Nov. 2004.*

* cited by examiner

PRIOR ART

ACTIVE ENERGY RAY CURABLE AQUEOUS INK, AND INK-JET RECORDING PROCESS, INK CARTRIDGE, RECORDING UNIT AND INK-JET RECORDING APPARATUS USING THE SAME

This application is a continuation of International Application No. PCT/JP2005/006425, filed on Mar. 25, 2005, which claims the benefit of Japanese Patent Application No. 2004-092370 filed on Mar. 26, 2004.

BACKGROUND OF THE INVENTION

1. Field of the Invention

The present invention relates to an active energy ray curable aqueous ink comprising a novel water-soluble polymerizable compound, and an ink-jet recording process, an ink cartridge, a recording unit and an ink-jet recording apparatus using this ink.

2. Related Background Art

There has heretofore been a technique that aqueous paints or inks are used in an active energy ray curing method comprising curing a resin composition in an ink by irradiation of light including active energy rays to form a cured film of a resin, thereby forming images. As for the material composition of the aqueous paints or inks used in this case, active energy ray curable resin compositions of a non-aqueous type are used, which are prepared into emulsions. Such an active energy ray curable resin composition in itself is not water-soluble. In such a technique, the hydrophilization of an ultraviolet curable resin itself or catalyst itself has been recognized as a problem to be solved. However, the hydrolization has not been realized under the circumstances.

Even in an ink-jet printing method, active energy ray curable inks are publicly known. However, resin compositions used in this case are also non-aqueous. As typical examples thereof, are known the so-called oil-based inks in which a pigment is dispersed in an organic solvent such as toluene or methyl ethyl ketone. Inks making no use of any solvent and composed of a monomer, oligomer or pigment dispersion are used in an application field of marking. These inks are unstable for precision printing because they are difficult to lower the viscosity thereof, and so they are exclusively used in dot printing such as marking for which precision is not required.

Such oil-based inks used in the ink-jet system as described above do not have ink properties suitable for high-quality full-color printing. More specifically, the oil-based inks are preferably used with care from the viewpoint of environment. In the case of an active energy ray curable ink using no solvent, it may be used only in printers great in dot and low in resolution. In U.S. Pat. No. 4,978,969, it is disclosed to use vinylpyrrolidone in a great amount like a solvent, thereby dissolving an ultraviolet curable adhesive therein to provide it as an ink for ink-jet recording. In this technique, it is intended to use it in thermal ink-jet apparatus. However, such technique has great restrictions as to materials in fact, is poor in general-purpose properties for reasons of, for example, using a monomer in a great amount, and can not be used in formation of high-quality images. The reason why the situation of use of the active energy ray curable inks is as described above is as follows.

1) An ink or paint using a resin dissolved in water tends to become insufficient even if it is cured in that, for example, the water fastness or gloss of an image formed is low.
2) Water-soluble active energy ray curable resins and water-soluble polymerization initiators (hereinafter also referred to as "catalyst" merely), which fulfill a catalytic function of aiding the curing of such a resin, are scarcely developed.

With respect to active energy ray curable aqueous inks, the following fact is further indicated as the cause that the material technique itself is hard to be advanced.

3) The use of water as a solvent poses a negative aspect from the viewpoint of practical use because water consumes a large quantity of energy for drying compared with organic solvents.

However, in fact, the active energy ray curing technique is expected as a curing technique that saves energy and is little in environmental pollution and environmental burden. The use of the active energy ray curing method is said to be useful in not only printing of images but also pretreatment for imparting printability to a printing base material and post-treatment for coating the base material printed with a material for protection or application in ink-jet printing.

Even to an application to ink-jet recording inks for full-color high-quality printing, hydrophilic materials such as the above-described water-soluble active energy ray curable resins and catalysts are extremely few under the circumstances. In order to apply them to an ink-jet system, materials that can be used in high-density nozzles and are low in viscosity and good in flowability are required. For example, resin materials (catalysts, polymerizable materials), by which the amount of a polymerizable compound added into an ink can be increased, actual drying time can be shortened, and the physical properties of an ink film cured in applying the ink to a recording medium followed by curing become excellent, and which have good compatibility with colorants, are required.

As first examples of such water-soluble active energy ray curable materials, for example, an ester of succinic anhydride and 2-hydroxyethyl (meth)acrylate, an ester of orthophthalic anhydride and 2-hydroxyethyl (meth)acrylate and vinylnaphthalenesulfonic acid are practically used as water-soluble polymerizable compounds having both acidic group and (meth)acryloyl group or vinyl group in a molecule.

As second examples, polymerizable compounds, to which hydrophilicity has been imparted by a polyethylene oxide chain, are known as compounds having at least 2 polymerizable functional groups in a molecule and industrially produced. Examples of such compounds include (meth)acrylic esters of polyhydric alcohols, such as diethylene glycol di(meth)acrylate and tetraethylene glycol di(meth)acrylate.

Japanese Patent Application Laid-Open No. H8-165441 discloses polyfunctional water-soluble polymerizable compounds. The compounds disclosed herein are obtained by a technique that water solubility is attained by increasing the number of hydroxyl groups in a molecule for imparting water solubility.

In Patent Documents, Japanese Patent Application Laid-Open Nos. H8-165441 and 2000-117960, (meth)acrylic esters of hydrophilic polyepoxides derived from a polyalcohol, and the like are practically used. These compounds are excellent in polymerizability by an active energy ray and physical properties of cured materials thereof, and the viscosities of aqueous solutions thereof meet a level required for ink-jet inks.

However, the compounds of the first examples may not become principal materials for water-soluble active energy ray curable materials because the number of polymerizable functional groups is one in a molecule, so that the rate of polymerization is slow, and the degree of crosslinking of cured materials thereof is markedly low.

According to an investigation by the present inventors, the compounds of the second examples have no water solubility when the length of the ethylene oxide chain is short, or involve a problem that physical properties of solids at the time they are polymerized or cured are often insufficient in performance required for paints or inks, such as hardness and adhesive property though the water solubility is achieved when the length of the ethylene oxide chain is long.

According to an investigation by the present inventors, the compounds in Japanese Patent Application Laid-Open No. H8-165441 are certainly excellent in polymerizability by an active energy ray and also in physical properties of cured materials thereof, but involve a problem that the viscosities of aqueous solutions thereof are somewhat high compared with the level required for ink-jet inks.

In Japanese Patent Application Laid-Open Nos. 2000-117960 and 2002-187918, when a hydrophilic dye soluble in water by an anionic functional group or an aqueous pigment dispersion that a pigment is dispersed in water by an anionic functional group is used as a colorant in an ink containing a water-soluble polymerizable material having a (meth)acrylate group, the pH of the ink is lowered to an acidic range with the formation of acrylic acid by hydrolysis of the (meth)acrylate group, whereby deposition of the hydrophilic dye stably dissolved in the ink at a pH of an alkaline to neutral range, or aggregation of the aqueous pigment dispersion stably dispersed at such a pH may occur in some cases, so that a problem arises from the viewpoint of long-term storability. In addition, in the case where a recording method is of an ink-jet recording system that thermal energy corresponding to recording signals is applied to generate ink droplets by the energy, the water-soluble polymerizable compound in the ink has been thermally polymerized by the thermal energy to form a polymer insoluble in water in a nozzle, thereby causing inconvenience in ejection of the ink.

It is accordingly a first object of the present invention to provide an active energy ray curable aqueous ink which is quickly polymerized by an active energy ray, high in crosslinking degree of a cured material formed therefrom and also excellent in adhesive property to recording media.

A second object of the present invention is to provide a water-soluble active energy ray curable ink which is quickly polymerized by an active energy ray, high in crosslinking degree of a cured material formed therefrom and also excellent in adhesive property to recording media, which ink is an active energy ray curable aqueous ink for ink-jet recording wherein the viscosity thereof meets the low-viscosity level required for ink-jet inks, and the ink has excellent long-term storability.

A third object of the present invention is to provide a water-soluble active energy ray curable ink quickly polymerized by an active energy ray, high in crosslinking degree of a cured material formed therefrom and also excellent in adhesive property to recording media, which ink is an active energy ray curable aqueous ink for ink-jet recording wherein the viscosity thereof meets the low-viscosity level required of ink-jet inks, and the ink has such an excellent long-term storability and excellent ejection stability that occurrence of thermal polymerization by thermal energy is prevented not to adversely affect the ejection of the ink even when a recording method is of an ink-jet recording system that thermal energy corresponding to recording signals is applied to generate ink droplets by the energy.

A fourth object of the present invention is to provide an ink-jet recording process, an ink cartridge, a recording unit and an ink-jet recording apparatus using this aqueous ink.

The above objects are achieved by the present invention described below.

SUMMARY OF THE INVENTION

According to the present invention, there is thus provided an active energy ray curable aqueous ink comprising at least water and a polymerizable material which is radically polymerized by an active energy ray, wherein the polymerizable material is a water-soluble polymerizable material represented by the following general formula (I):

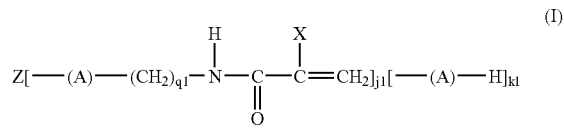

wherein Z is a residue of a polyol, j1 is an integer of 2 to 6, k1 is an integer of 0 to 2, j1+k1 is an integer of 2 to 6, q1 is an integer of 1 to 4, X is hydrogen or a methyl group, and (A) is any one group of groups represented by the following general formulae (II) and (III), with the proviso that the general formulae (II) and (III) are not simultaneously contained in the general formula (I)

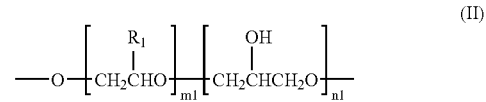

wherein m1 is an integer of 1 to 5, n1 is 0 or 1, and $R_1$ is hydrogen or a methyl group; and

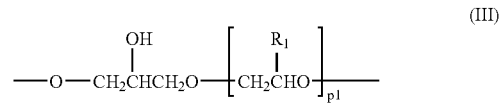

wherein p1 is an integer of 1 to 5, and $R_1$ is hydrogen or a methyl group.

According to the present invention, there is also provided an ink-jet recording process comprising the steps of ejecting the above-described aqueous ink on a recording medium and irradiating the recording medium, to which the aqueous ink has been applied, with an active energy ray to cure the aqueous ink.

According to the present invention, there is further provided an ink cartridge comprising an ink containing portion containing the above-described aqueous ink.

According to the present invention, there is still further provided a recording unit comprising an ink containing portion containing the above-described aqueous ink and a recording head for ejecting the aqueous ink.

According to the present invention, there is yet still further provided an ink-jet recording apparatus comprising a means for applying the above-described aqueous ink to a recording medium and a means for irradiating the aqueous ink applied to the recording medium with an active energy ray.

According to the first embodiment of the present invention, there can be provided an active energy ray curable aqueous ink which is quickly polymerized by an active energy ray, high in crosslinking degree of a cured material formed therefrom and also excellent in adhesive property to recording media.

According to the second embodiment of the present invention, there can be provided an active energy ray curable aqueous ink which is a water-soluble active energy ray curable ink quickly polymerized by an active energy ray, high in crosslinking degree of a cured material formed and also excellent in adhesive property to recording media, and wherein the viscosity thereof meets the low-viscosity level required of ink-jet inks, and the ink has excellent long-term storability.

According to the third embodiment of the present invention, there can be provided a water-soluble active energy ray curable ink which is quickly polymerized by an active energy ray, high in crosslinking degree of a cured material formed and also excellent in adhesive property to recording media, which ink is an active energy ray curable aqueous ink for ink-jet recording wherein the viscosity thereof meets the low-viscosity level required for ink-jet inks, and the ink has excellent long-term storability and such an excellent ejection stability that occurrence of thermal polymerization by thermal energy is prevented not to adversely affect the ejection of the ink even when a recording method is of an ink-jet recording system that thermal energy corresponding to recording signals is applied to generate ink droplets by the energy, and also provided an ink-jet recording process, an ink cartridge, a recording unit and an ink-jet recording apparatus using this ink.

DETAILED DESCRIPTION OF THE PREFERRED EMBODIMENTS

Figure 1:
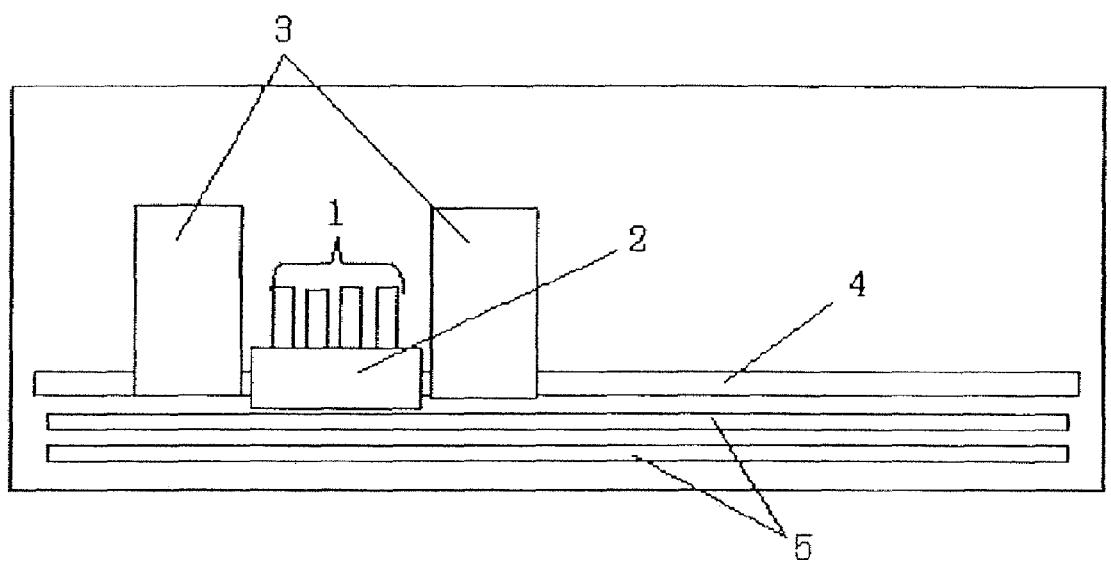
FIG. 1 schematically illustrates a front of a printer suitable for use in the present invention.

The present invention will hereinafter be described in detail by the preferred embodiments. The present inventors have prepared active energy ray curable aqueous inks comprising water and a water-soluble polymerizable material which is radically polymerized by an active energy ray and represented by the general formula (I) in the course of various investigations with the above-described objects in view to evaluate the active energy ray curable aqueous inks. As a result, it has been found that the active energy ray curable aqueous inks having such constitution are excellent in curing performance such as crosslinking degree of cured materials thereof and adhesive property, and moreover meet the low-viscosity level required for ink-jet inks and have excellent long-term storability and ejection stability, thus leading to completion of the present invention.

The reason why the results that not only curing performance but also long-term storability and ejection stability become excellent are attained is not clearly known. However, it is considered to be as follows.

With respect to the long-term storability of the ink, the water-soluble polymerizable material according to the present invention, which has a (meth)acrylamide structure, is hard to be influenced by hydrolysis compared with the water-soluble polymerizable material having an acrylic ester structure, and so an amount of acrylic acid produced is small. It is therefore considered that the lowering of the pH of the ink to an acidic range is inhibited, whereby a hydrophilic dye stably dissolved in water by the anionic functional group or an aqueous pigment dispersion in which a pigment is dispersed in water by anionic functional groups can be stably dissolved or dispersed in water, and so the long-term storability of the ink becomes excellent.

With respect to the ejection stability, the reason is considered to be attributable to either the circumstance that the water-soluble polymerizable material having a (meth)acrylamide structure has high resistance to thermal polymerization compared with the water-soluble polymerizable material having an acrylic ester structure, or the circumstance that the amount of acrylic acid produced by hydrolysis is small, and so the thermal polymerization of acrylic acid itself is inhibited.

The action and effect of the active energy ray curable aqueous ink according to the present invention in aqueous ink-jet printing that is a main applied example of the aqueous ink will hereinafter be described.

Incidentally, ultraviolet rays, electron beams or the like may be used as the active energy rays used in the present invention. However, description will hereinafter be given, taking as a typical example an ultraviolet ray curable ink that is cured by radical polymerization with ultraviolet rays and is particularly preferably used. The active energy rays used for the curing in the present invention are not limited to the ultraviolet rays.

The main object of using the active energy ray curable aqueous ink according to the present invention as an aqueous ink for image formation used in an aqueous ink-jet recording method resides in, for example, the following points.

1) The drying ability of the ink is improved to permit improvement in printing speed.

2) The water-soluble polymerizable material is caused to act as a binder for colorant to permit realizing the formation of images excellent in abrasion resistance on a wide variety of recording media.

3) Scattering from pigment particles is lowered to permit the formation of a transparent ink layer.

4) As a result, a color reproduction range of a process color is widened to give an ink such an image-forming ability as to provide high density and also excellent saturation and lightness.

5) It is further possible to protect the colorant from active light, gas components in air, water, etc.

The active energy ray curable aqueous ink according to the present invention has a marked effect particularly on recording media having ink absorbency but hard to improve coloring of pigments and abrasion resistance, such as plain paper, from the viewpoint of improving these properties. The active energy ray curable aqueous ink according to the present invention makes it possible to conduct printing on a base material for printing having no absorbency with an aqueous ink.

The curing method by the active energy rays is considered as a force-drying method and may be said to be a method of freezing a state of an ink applied to a recording medium such as paper within a time period that the ink forms a free surface before it completely penetrates into the paper. In the active energy ray curable aqueous ink according to the present invention, penetration and evaporation of a solvent component such as water gradually and slowly progress. However, since apparent drying quickly takes place as described above, the fixing time from the meanings of conveyance, stacking and the like of the paper can be considered short. However, it is unavoidable that true drying of this ink becomes slow compared with an ink using an organic solvent so far as an aqueous solvent is used. When the ink according to the present invention is sued, it is thus allowed to provide a final force-drying machine according to uses.

How the curing of a water-soluble polymeric material which undergoes radical polymerization by the active energy rays progresses in the presence of water is a purely important as a problem of a radical reaction rate. According to an investigation by the present inventors, it has not been observed that polymerization in water as to a colorless ink containing no colorant is particularly slow compared with a case where no solvent is used. It goes without saying that physical properties of solids are different from those in the case where no solvent is used because they contain water.

Respective components making up the active energy ray curable aqueous ink according to the present invention, which has such excellent action and effect as described above, will hereinafter be described.

(Water-Soluble Polymerizable Material)

A water-soluble polymerizable material according to an embodiment of the present invention is represented by the following general formula (I):

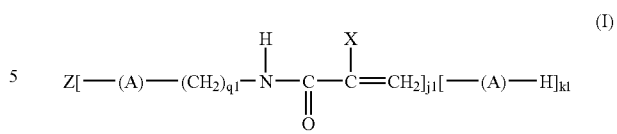

wherein Z is a residue of a polyol, j1 is an integer of 2 to 6, k1 is an integer of 0 to 2, j1+k1 is an integer of 2 to 6, q1 is an integer of 1 to 4, X is hydrogen or a methyl group, and (A) is any one group of the groups represented by the following general formulae (II) and (III), with the proviso that the general formulae (II) and (III) are not simultaneously contained in the general formula (I)

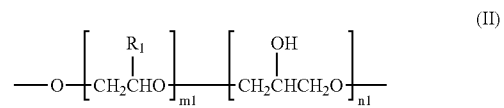

wherein m1 is an integer of 1 to 5, n1 is 0 or 1, and $R_1$ is hydrogen or a methyl group; and

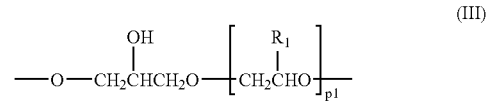

wherein p1 is an integer of 1 to 5, and $R_1$ is hydrogen or a methyl group.

In the present invention, the number of the polymerizable functional groups in the water-soluble material is preferably within a range of from 2 to 6, more preferably from 3 to 6 from the viewpoint of curing performance of the resulting ink and the provision of an ink having a low viscosity. Although the curing performance is improved as the number of the polymerizable functional groups in the water-soluble material increases, viscosity increase of the ink is observed with the increase in the number of the functional groups, so that it is hard to provide an active energy ray curable aqueous ink having good flowability which corresponds to high-density nozzles in an ink-jet system. When the number of the polymerizable functional groups in the water-soluble polymerizable material is 1, a polymerization rate becomes slow, and the crosslinking degree of a cured material of the resulting polymer is low, so that such a polymerizable material is not suitable for use as a material of the active energy ray curable aqueous ink according to the present invention.

Hydrophilicity is impaired to the water-soluble polymerizable material by an ethylene oxide chain/propylene oxide chain and a hydroxyl group contained in the general formulae (II) and (III). The number of ethylene oxide chains or propylene oxide chains contained in the general formula (II) or (III) is preferably within a range of from 1 to 5, more preferably from 2 and 3. If the length of the ethylene oxide chain or propylene oxide chain contained in the water-soluble polymerizable material is shorter, such a material becomes water-insoluble. If the length of the ethylene oxide chain or propylene oxide is long on the other hand, good water-solubility is achieved, but physical properties of solids upon polymerization or curing may become insufficient in performance such as hardness and adhesive property in some cases.

In the present invention, the polyol residue represented by Z means a group obtained by removing at least 2 hydroxyl groups from a polyol. Preferable examples of the polyol include ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerol, 1,2,4-butanetriol, 1,2,6-hexanetriol, 1,2,5-pentanetriol, thiodiglycol, trimethylolpropane, ditrimethylolpropane, trimethylolethane, ditrimethylolethane, neopentyl glycol, pentaerythritol, dipentaerythritol and condensates thereof. Examples of other polyols include low-molecular weight polyvinyl alcohols, monosaccharides such as triose, tetrose (erythritol, threitol), pentose (ribitol, arabinitol, xylitol), hexose (allitol, altritol, glucitol, mannitol, iditol, galactitol, inositol), heptose, octose, nonose and decose and deoxy sugars thereof, aldonic acid, and aldaric acid derivatives. However, polyols used in the present invention are not limited to these polyols. Among these polyols, glycerol, 1,2,4-butanetriol, 1,2,6-hexanetriol, 1,2,5-pentanetriol, trimethylolpropane, trimethylolethane, neopentyl glycol and pentaerythritol are particularly preferred.

Specific particularly preferable examples of the water-soluble polymerizable material include water-soluble polymerizable materials of, for example, the structures described below. However, water-soluble polymerizable materials used in the present invention are not limited these materials. These compounds are high in hydrophilicity, water-soluble, polymerizable, high in polymerization rate and low in viscosity of the compound themselves. When they are prepared into aqueous solution, the viscosities of such solutions are extremely low compared with those of conventionally known compounds. In the present invention, 2 or more of these water-soluble polymerizable materials may be used in combination.

Exemplified Compound 1

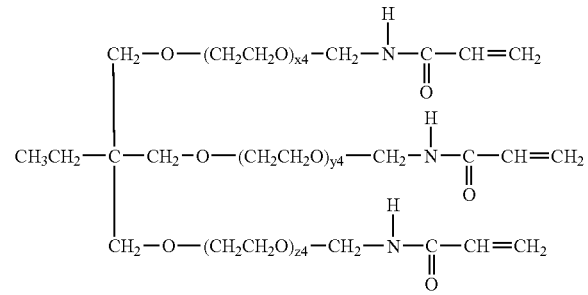

wherein Z is an ethylene glycol residue: —CH$_2$—CH$_2$—.

Exemplified Compound 2

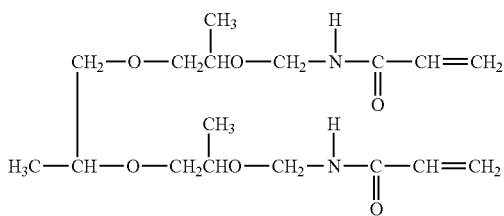

wherein Z is a propylene glycol residue:

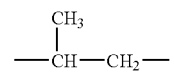

Exemplified Compound 3

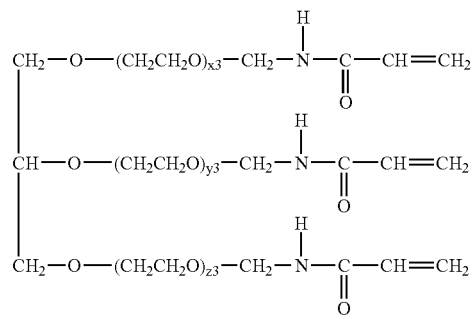

$x_3 + y_3 + z_3 = 6$ wherein Z is a glycerol residue:

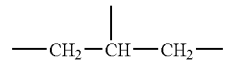

Exemplified Compound 4

$x_4 + y_4 + z_4 = 9$ wherein Z is trimethylolpropane residue:

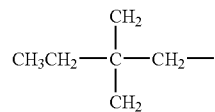
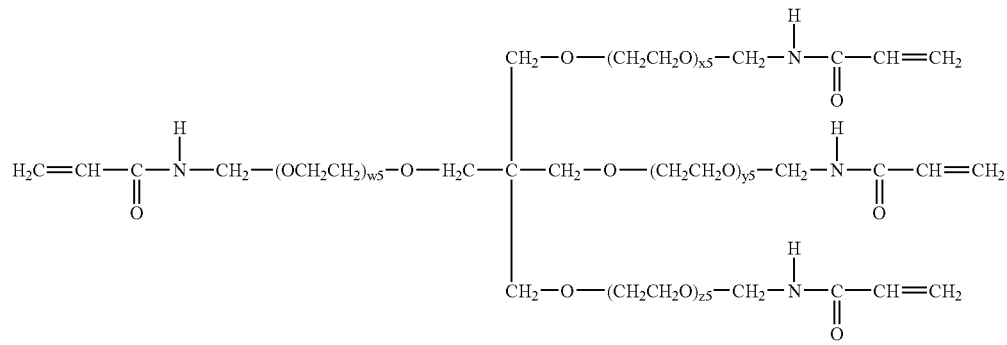
Exemplified Compound 5
$w_5 + x_5 + y_5 + z_5 = 6$
wherein Z is a pentaerythritol residue:
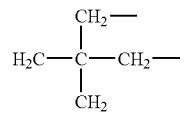
Exemplified Compound 6
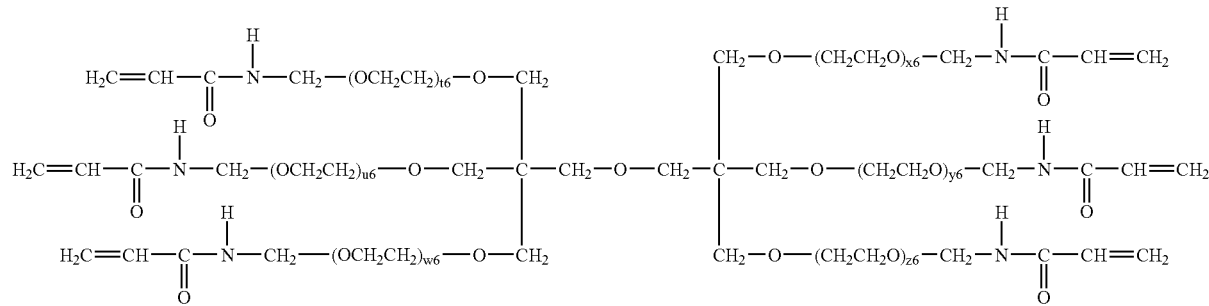
$t_6 + u_6 + w_6 + x_6 + y_6 + z_6 = 12$
wherein Z is a dipentaerythritol residue:
-continued
Exemplified Compound 7
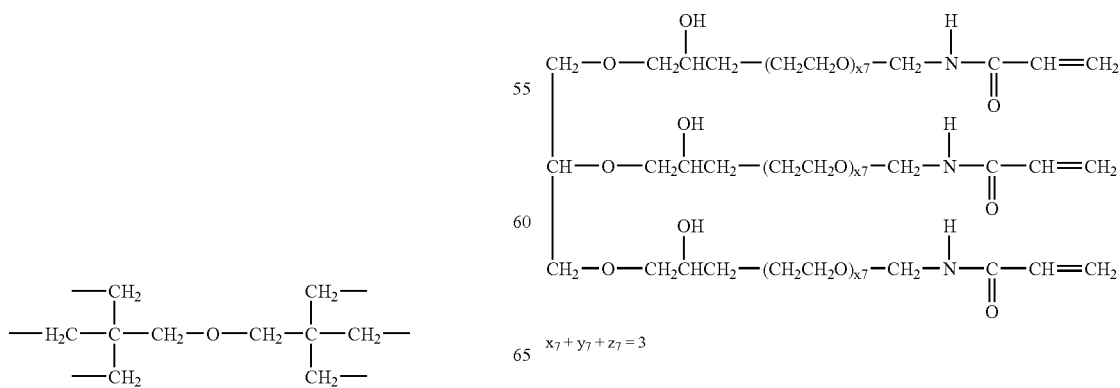
$x_7 + y_7 + z_7 = 3$ wherein Z is a glycerol residue:

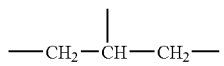

Exemplified Compound 8

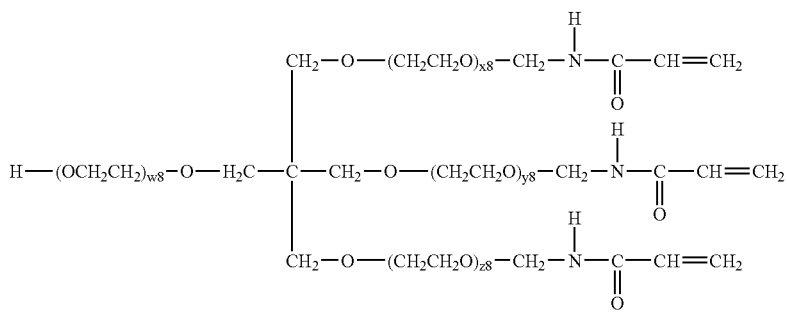

$w_8 + x_8 + y_8 + z_8 = 6$ wherein Z is a pentaerythritol residue:

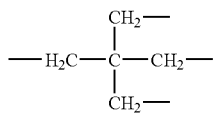

Exemplified Compound 9

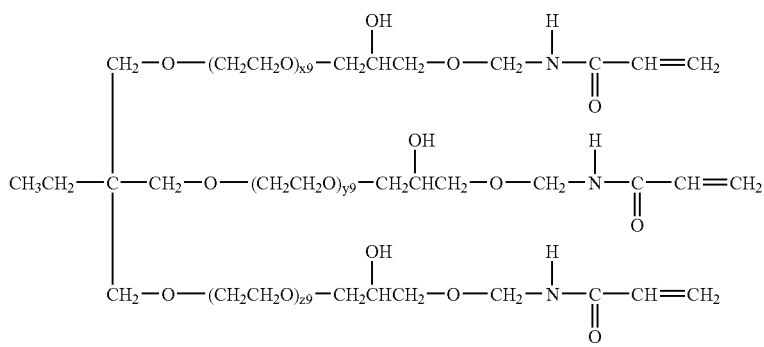

$x_9 + y_9 + z_9 = 3$ wherein Z is a trimethylolpropane residue:

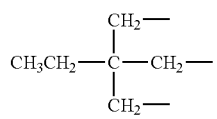

Among these, Exemplified Compounds 3, 4, 5, 7 and 9 are preferred, with Exemplified Compounds 3, 4 and 5 being particularly preferred.

The water-soluble polymerizable material represented by the general formula (I) is prepared in accordance with such a process as described below.

A water-soluble polymerizable material, in which (A) in the general formula (I) is represented by the chemical formula (II) and $n_1$ is 0, is obtained by conducting an addition reaction of any one of the above-mentioned polyols with ethylene oxide or propylene oxide to add the optional equivalent numbers of ethylene oxide chains or propylene oxide chains, and then subjecting the resultant compound to a dehydration condensation reaction with an alkanol (meth) acrylamide having 1 to 4 carbon atoms. A water-soluble polymerizable material, in which (A) in the general formula (I) is represented by the chemical formula (II) and $n_1$ is 1, is obtained by conducting an addition reaction of any one of the above-mentioned polyols with ethylene oxide or propylene oxide to add the optional equivalent numbers of ethylene oxide chains or propylene oxide chains, reacting the resultant compound with epichlorohydrin to introduce a glycidyl group, and then reacting the resultant compound with an alkanol (meth)acrylamide having 1 to 4 carbon atoms.

A water-soluble polymerizable material, in which (A) in the general-formula (I) is represented by the chemical formula (III), is obtained by reacting any one of the above-mentioned polyols with epichlorohydrin and then reacting the resultant polyglycidyl ether compound with an alkanol (meth)acrylamide having 1 to 4 carbon atoms with an ethylene oxide-chain or a propylene oxide chain added thereto.

(Water-Soluble Polymerization Initiator)

A water-soluble polymerization initiator according to an embodiment of the present invention may be any one so far as it is a water-soluble compound capable of generating a radical by an active energy ray. However, it is preferably at least one compound selected from the group consisting of the following general formulae (IV) and (VI) to (IX)

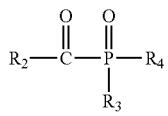
(IV)

wherein $R_2$ is an alkyl or phenyl group, $R_3$ is an alkyloxy or phenyl group, and $R_4$ is the following formula (V)

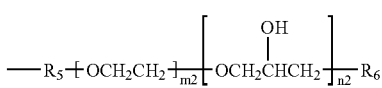
(V)

in which $R_5$ is —$[CH_2]_{x2}$— (x2 being 0 or 1) or a phenylene group, m2 is an integer of 0 to 10, n2 is 0 or 1, $R_6$ is hydrogen, a sulfone, carboxyl or hydroxyl group, or a salt thereof;

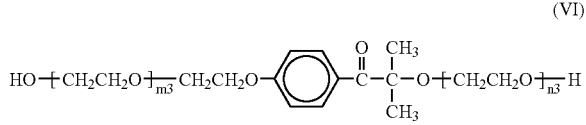
(VI)

wherein m3 is an integer of 1 or greater, n3 is an integer of 0 or greater, and m3+n3 is an integer of 1 to 8;

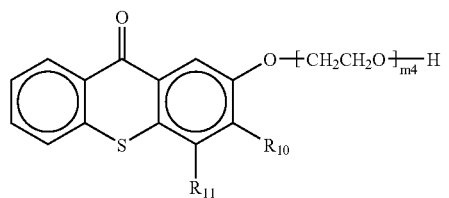
(VII)

wherein $R_{10}$ and $R_{11}$ are, independently of each other, hydrogen or an alkyl group, and m4 is an integer of 5 to 10;

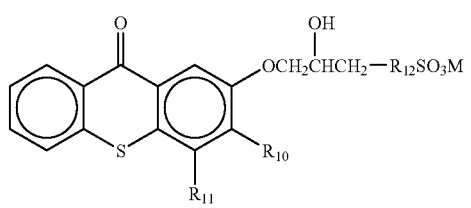
(VIII)

wherein $R_{10}$ and $R_{11}$ are, independently of each other, hydrogen or an alkyl group, $R_{12}$ is —$(CH_2)_x$— (x being 0 or 1), —O—$(CH_2)_y$— (y being 1 or 2) or a phenylene group, and M is hydrogen or an alkali metal; and

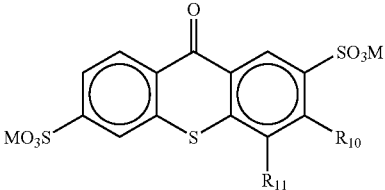
(IX)

wherein $R_{10}$ and $R_{11}$ are, independently of each other, hydrogen or an alkyl group, and M is hydrogen or an alkali metal.

Among these, compounds represented by the general formulae (IV), (VI) and (VII) are preferred, with compounds represented by the general formulae (IV) and (VI) being particularly preferred.

The alkyl group or phenyl group of $R_2$ may have a substituent. Examples of such a substituent include halogens, lower alkyl groups having 1 to 5 carbon atoms, lower alkyloxy groups having 1 to 5 carbon atoms, groups represented by the general formula (V), a sulfone group, a carboxyl group, a hydroxyl group, and salts (—$SO_3M$, —$CO_2M$ and —OM) of the sulfone, carboxyl and hydroxyl groups. Examples of such M include hydrogen, alkali metals, alkaline earth metals and ammonium represented by $HNR_7R_8R_9$ ($R_7$, $R_8$ and $R_9$ being, independently of each other, hydrogen, an alkyl group having 1 to 5 carbon atoms, a monohydroxyl-substituted lower alkyl group having 1 to 5 carbon atoms or a phenyl group).

$R_2$ is particularly preferably a phenyl group having, as a substituent, an alkyl group having 1 to 5 carbon atoms.

The phenylene group of $R_5$ may have a substituent. Examples of such a substituent include halogens, lower alkyl groups having 1 to 5 carbon atoms, lower alkyloxy groups having 1 to 5 carbon atoms, a sulfone group, a carboxyl group, a hydroxyl group, and salts (—$SO_3M$, —$CO_2M$ and —OM) of the sulfone, carboxyl and hydroxyl groups. Examples of such M include hydrogen, alkali metals, alkaline earth metals and ammonium represented by $HNR_7R_8R_9$ ($R_7$, $R_8$ and $R_9$ being, independently of each other, hydrogen, an alkyl group having 1 to 5 carbon atoms, a monohydroxyl-substituted lower alkyl group having 1 to 5 carbon atoms or a phenyl group).

Examples of the salt of $R_6$ include —$SO_3M$, —$CO_2M$ and —OM. Examples of such M include hydrogen, alkali metals, alkaline earth metals and ammonium represented by $HNR_7R_8R_9$ ($R_7$, $R_8$ and $R_9$ being, independently of each other, hydrogen, an alkyl group having 1 to 5 carbon atoms, a monohydroxyl-substituted lower alkyl group having 1 to 5 carbon atoms or a phenyl group).

The alkyloxy group or phenyl group of $R_3$ may have a substituent. Examples of such a substituent include halogens, lower alkyl groups having 1 to 5 carbon atoms, lower alkyloxy groups having 1 to 5 carbon atoms Particularly preferable $R_3$ is an alkyloxy group. In particular, —$OC_2H_5$ and —$OC(CH_3)_3$ or preferred.

The alkyl groups of $R_{10}$ and $R_{11}$ may have a substituent. Examples of such a substituent include halogens, a sulfone group, a carboxyl group, a hydroxyl group, and salts (—SO$_3$M, —CO$_2$M and —OM) of the sulfone, carboxyl and hydroxyl groups. Examples of such M include hydrogen, alkali metals, alkaline earth metals and ammonium represented by HNR$_7$R$_8$R$_9$ (R$_7$, R$_8$ and R$_9$ being, independently of each other, hydrogen, an alkyl group having 1 to 5 carbon atoms, a monohydroxyl-substituted lower alkyl group having 1 to 5 carbon atoms or a phenyl group).

Specific particularly preferable examples of these water-soluble polymerization initiators include water-soluble polymerizable materials of, for example, the structures described below. However, water-soluble polymerization initiators used in the present invention are not limited these materials.

Exemplified Compound 10

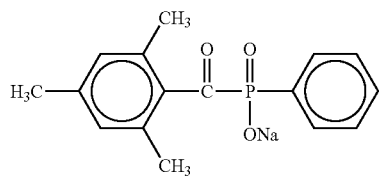

Exemplified Compound 11

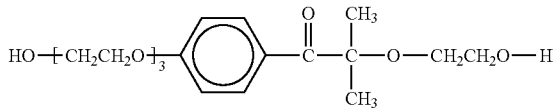

Exemplified Compound 12

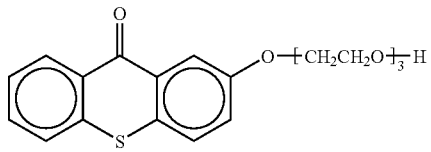

Exemplified Compound 13

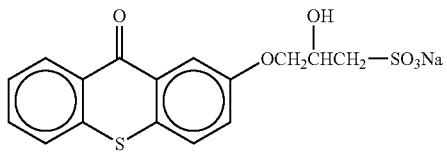

Exemplified Compound 14

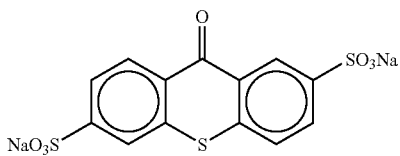

When a thioxanthone type water-soluble polymerization initiator or the like is used as the water-soluble polymerization initiator in the present invention, a hydrogen donor is preferably added. Examples of hydrogen donors usable in the present invention include triethanolamine and the like.

In the present invention, 2 or more water-soluble polymerization initiators may be used in combination. Two or more water-soluble polymerization initiators are added, whereby it can be expected to cause generation of an additional radical by using light of a wavelength, which cannot be effectively utilized by one kind of water-soluble polymerization initiator. Such a water-soluble polymerization initiator as described above is not always required when an electron beam-curing method that electron beams are used as active energy rays to cure an ink is applied.

(Aqueous Pigment Dispersion)

A pigment, which is a colorant, is contained in the active energy ray curable aqueous ink according to the present invention, whereby it can be used as a colored active energy ray curable ink or active energy ray curable paint that is cured by irradiation of active energy rays or the like. In this case, an aqueous pigment dispersion obtained by uniformly dispersing a pigment as a colorant in an aqueous medium is preferably used. As the aqueous pigment dispersion, is particularly preferably used an aqueous pigment dispersion obtained by stably dispersing a pigment in water with an anionic functional group. For example, an aqueous gravure ink, an aqueous pigment dispersion for writing utensils or a conventionally known pigment dispersion for ink-jet inks, which is stable in a nonionic or anionic system, may be applied as it is.

Pigment dispersions with a pigment dispersed with an alkali-soluble water-soluble polymer having an anionic dissociating group are disclosed in, for example, Japanese Patent Application Laid-Open Nos. H5-247392 and H8-143802. Pigment dispersions with a pigment dispersed with a surfactant having an anionic dissociating group are disclosed in Japanese Patent Application Laid-Open No. H8-209048. Pigment dispersions with a pigment encapsulated with a polymer and dispersed by adding an anionic dissociating group to surfaces of the resultant capsules are disclosed in Japanese Patent Application Laid-Open Nos. H10-140065, H9-316353, H9-151342, H9-104834 and H9-031360. As a pigment dispersion with a pigment dispersed by binding an anionic dissociating group to the surface of the pigment by a chemical reaction, may be mentioned such dispersions as disclosed in U.S. Pat. No. 5,851,280. In the ink according to the present invention, any of the above-described various kinds of pigment dispersions may be used as a colorant for the ink.

The active energy ray curable aqueous ink according to the present invention is not limited to inks containing such a pigment as described above and may also be provided as inks of such a mode that a water-soluble dye is used as a colorant, and the dye is contained in a dissolved state so far as fading by irradiation of active energy rays does not become a problem from the viewpoint of practical use. A colorant dispersion containing a disperse dye, oil-soluble dye or the like in a dispersed state may also be applied like the above-described pigment dispersion. These may be suitably selected as necessary for end applications intended.

When a pigment is used as a colorant for the ink according to the present invention, it is necessary to use a pigment dispersion with the pigment dispersed in a state of fine particles in a medium thereof. As fundamental factors of the pigment dispersion preferably usable in an ink-jet recording ink, it is particularly necessary that the pigment is dispersed in an aqueous medium, a particle size distribution as a dispersion falls within a range of from 25 nm to 350 nm, and the viscosity of a final ink can be adjusted within a range not affecting ejection, and further that compatibility with the above-described active energy ray curable water-soluble polymerizable material according to the present invention, which is essential for making the ink active energy ray-curable, is satisfied. Respective components usable in the pigment dispersion suitable for use in the present invention will hereinafter be described.

<Pigment>

As organic pigments each having a hue as a process color used in a color ink, may be suitably used those mentioned below. When organic pigments are indicated by COLOR INDEX (C.I.) numbers, examples thereof include C.I. Pigment Yellow 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180 and 185; C.I. Pigment Orange 16, 36, 43, 51, 55, 59, 61 and 71; C.I. Pigment Red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255 and 272; C.I. Pigment Violet 19, 23, 29, 30, 37, 40 and 50; C.I. Pigment Blue 15, 15:1, 15:3, 15:4, 15:6, 22, 60 and 64; C.I. Pigment Green 7 and 36; and C.I. Pigment Brown 23, 25 and 26.

<Particle Diameter of Pigment in Ink>

The average particle diameter of pigment particles is within a range of from 25 nm to 350 nm, preferably from 70 nm to 200 nm. Since this range is sufficiently shorter than the wavelength of a visible ray, a print, which may be said to be sufficiently transparent when scattering is little, is provided though it depends on uses of the print.

<Dye>

In the case of, for example, the active energy ray curable aqueous ink according to the present invention, it is preferable that after the ink is applied to a recording medium (recording paper or the like), the active energy ray curable polymerizable material in the ink be polymerized and cured by active energy rays. When a dye is used as a colorant as described above, it is difficult to use the dye in a condition where no fading is caused by irradiation of the active energy rays unlike the case where the pigment is used, and so the use of the dye causes some fading. From this reason, it is preferable to use the so-called azo metallized dye, in which a complex is formed by a metal ion, when a dye is used as a colorant for the ink, since fading by light is little. When the level of fading is out of consideration, however, at least an ink may be made up even of a general water-soluble dye. On this premise, dye species applicable in the sense that they have a color of a process color are such compounds as described below. When they are indicated by COLOR INDEX (C.I.) numbers, examples thereof include C.I. Acid Yellow 11, 17, 23, 25, 29, 42, 49, 61 and 71; C.I. Direct Yellow 12, 24, 26, 44, 86, 87, 98, 100, 130, 132 and 142; C.I. Acid Red 1, 6, 8, 32, 35, 37, 51, 52, 80, 85, 87, 92, 94, 115, 180, 254, 256, 289, 315 and 317; C.I. Direct Red 1, 4, 13, 17, 23, 28, 31, 62, 79, 81, 83, 89, 227, 240, 242 and 243; C.I. Acid Blue 9, 22, 40, 59, 93, 102, 104, 113, 117, 120, 167, 229, 234 and 254; and C.I. Direct Blue 6, 22, 25, 71, 78, 86, 90, 106 and 199. A preferable concentration of the dye in the ink is within a range of from 0.1 to 10% by mass. When the concentration is low, such an ink is suitably used as, for example, a light color ink for the so-called density modulation ink.

<Formulation in the Case of Clear Ink>

The active energy ray curable aqueous ink according to the present invention may be provided as a clear ink by preparing a transparent aqueous ink without containing such a colorant as described above. When it is prepared so as to have ink-jet recording properties in particular, an active energy ray curable aqueous clear ink for ink-jet recording is provided. When such an ink is used, a clear coating can be obtained because the ink contains no colorant. Examples of uses of the clear ink containing no colorant include an undercoating ink for imparting suitability for image printing to recording media and an overcoating ink for the purpose of protecting the surface of an image formed with an ordinary ink and adding additional decoration, gloss and the like. A colorless pigment or fine particles, or the like, which are not intended for coloring, may be dispersed and contained in the clear ink according to uses such as prevention of oxidation and prevention of fading. The addition of them can improve various properties such as image quality, fastness properties and handling property of the resulting print in either the undercoat or the overcoat.

When the water-soluble polymerizable material is applied to such a clear ink, the content thereof is preferably 10 to 70% by mass based on the whole mass of the ink. The ink is also preferably prepared in such a manner that the water-soluble polymerization initiator (for example, active energy ray polymerization catalyst) is contained in a proportion of 1 to 10 parts by mass per 100 parts by mass of the polymerizable compound and in a proportion of at least 0.5 parts by mass per 100 parts by mass of the ink.

<Reactive Diluent Component>

When the active energy ray curable aqueous ink according to the present invention is utilized as a clear ink as described above, a hydrophilic polymerization-reactive monomer having a low viscosity may be contained as a solvent. The merit in using such a material in place of an ordinary solvent resides in that such a material does not remain as a plasticizer in solids after a curing reaction by an active energy ray, and so influence on the physical properties of the solids is reduced. Examples of a reactive diluent component selected for such an object include acryloylmorpholine used in the examples mentioned above, and besides, compounds such as N-vinylpyrrolidone, acrylamide, methylenebisacrylamide, monoacrylates of monosaccharides, monoacrylates of oligoethylene oxides and monoacrylates of dibasic acids.

<Solvent Component>

When the active energy ray curable aqueous ink according to the present invention is utilized as a clear ink, such a solvent for imparting moisturizing property as used heretofore in aqueous ink-jet inks in particular is preferably not used. The reason for it is that viscosity increase is little and viscosity increase can be easily restored even if some viscosity increase occurs, since a solid component such as the pigment is not contained in the case of the clear ink. Of course, it is allowable to add a solvent having higher moisturizing property in a minimum of a necessary amount. Such a solvent may be selected from a great number of compounds commonly used heretofore in aqueous ink-jet inks.

When the active energy ray curable aqueous ink according to the present invention is utilized as an ink containing a colorant, a solvent component may be added into the ink. The solvent component is added for the purpose of, for example, imparting non-volatility to the ink, reducing its viscosity and giving wettability to printing base material. When printing is conducted on a non-absorbent base material, the ink is preferably so prepared that only water is contained in the ink without containing a solvent component, and the entire polymerizable material component is cured and solidified.

When at least 10% of the solvent component is added into the ink, a printing medium (recording medium), on which an image is formed, is required to have certain absorbency in the sense of strength of an ink coating finally obtained. More specifically, in the case of printing with an aqueous gravure ink, a recording medium, to which certain wettability and permeability have been imparted, is used, and forced-drying is conducted. As with this, even in the ink according to the present invention, it is preferable that when at least 10% of the solvent component is added into the ink, the printing medium be subjected to a pretreatment for imparting aqueous ink-receptivity, and the ink be naturally or forcedly dried after it is cured by an active energy ray. Since the various kinds of water-soluble polymerizable materials disclosed in the present invention have certain moisturizing property (inhibition of evaporation of water, and absorption of water) by themselves, the ink may also be made up by completely expelling the solvent. In this case, a countermeasure such as capping, or suction of a fresh ink or vacant ejection at the beginning of printing may be used for the purpose of, securing reliability on printing at the level of practical use.

Water-soluble organic solvents, which can be used in the present invention and are relatively easily volatilized off, are mentioned below. Into the ink according to the present invention, may be added a solvent optionally selected from these organic solvents. Examples of the organic solvents include glycol ethers such as ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether and dipropylene glycol monomethyl ether, and monohydric alcohols.

<Material and Constitution in Colorant-Containing Ink>

When the active energy ray curable aqueous ink according to the present invention is utilized as a colorant-containing ink, it is preferable to control the concentrations of the catalyst and water-soluble polymerizable material in the ink in accordance with to absorption properties of a colorant contained. With respect to incorporation amounts, the amount of water or the solvent is preferably controlled within a range of from 40% to 90% by mass, particularly preferably from 60% to 75% by mass based on the whole mass of the ink. The amount of the active energy ray polymerizable compound contained in the ink is preferably within a range of from 1% to 35% by mass, particularly preferably from 10% to 25% by mass based on the whole mass of the ink. The amount of the polymerization catalyst varies according to the content of the active energy ray-polymerizable compound and is generally preferably within a range of from 0.1% to 7% by mass, particularly preferably from 0.3% to 5% by mass based on the whole mass of the ink.

When a pigment is used as the colorant of the ink, the concentration of the pure pigment contained in the ink is generally preferably within a range of from 0.3% to 10% by mass based on the whole mass of the ink. Although the tinting strength of the pigment varies according to the dispersed state of pigment particles, a range used as a light color ink is given when the concentration is within a range of about 0.3 to 1%. When the concentration is higher than such a range, a concentration used in a general color ink is given. The concentration of the pigment dispersion also depends on a viscosity and flowing property required by a printing apparatus.

With respect to the viscosity of the ink, the viscosity is not non-linear in a wide range in the case of an On-Demand ink-jet apparatus and the upper limit thereof is 15 mPa.s. In the case of a high-density and high-drive frequency nozzle, in which an ink dot is fine, the upper limit thereof is 10 mPa.s.

The surface tension thereof is preferably at least 35 mN/m (dyn/cm) in view of the use of the ink according to the present invention in printing on plain paper. In order to sufficiently inhibit a bleeding phenomenon between colors in printing on plain paper, it is necessary to control the surface tension to a low value of about 30 mN/m in ordinary ink-jet inks to penetrate ink droplets into a recording medium in a short period of time. However, this case is accompanied by lowering of image density.

On the other hand, in the active energy ray curable aqueous ink according to the present invention, the surface tension is preferably so high that ink droplets remain on the surface of a recording medium upon irradiation of active energy as much as possible. The ink droplets can be effectively cured on the surface of the recording medium to inhibit bleeding and at the same time achieve a high image density. In order to secure this image density, on the other hand, it is necessary to wet the recording medium to some extent with the ink droplets upon irradiation of active energy. Therefore, the upper limit of the surface tension is preferably about 50 mN/m.

<Printer System>

The ink according to the present invention is used in a head of an ink-jet ejection system and also useful as an ink containing container containing the ink or an ink for containing in this container. In particular, the present invention has excellent effects in recording heads and recording apparatus of a bubble-jet system among ink-jet recording systems.

With respect to the typical construction and principle thereof, those using the basic principle disclosed in, for example, U.S. Pat. Nos. 4,723,129 and 4,740,796 are preferred. This system may be applied to any of the so-called On-Demand type and continuous type. In particular, the On-Demand type is effective because at least one driving signal, which corresponds to recording information and gives a rapid temperature rise exceeding film boiling, is applied to an electrothermal converter arranged corresponding to a sheet or liquid path, in which an ink is held, thereby causing the electrothermal converter to generate thermal energy to cause film boiling on the heat-acting surface of a recording head, so that a bubble can be formed in the ink in response to the driving signal in relation of one to one. The ink is ejected through an ejection opening by the growth-contraction of this bubble to form at least one droplet. When this driving signal is applied in the form of a pulse, the growth-contraction of the bubble is suitably conducted in a moment, so that the ejection of the ink, which is excellent in responsiveness in particular, can be achieved. It is thus more preferable to use such pulsed signals. As the pulsed driving signal, such signals as described in U.S. Pat. Nos. 4,463,359 and 4,345,262 are suitable. When the conditions described in U.S. Pat. No. 4,313,124 that is an invention relating to the rate of temperature rise on the heat-acting surface are applied, far excellent recording can be conducted.

With respect to the construction of the recording head, the present invention is also effective on such combined constructions (linear liquid flow path or perpendicular liquid flow path) of ejection openings, a liquid flow path and electrothermal converters as disclosed in the above-described publications, and besides constructions based on U.S. Pat. Nos. 4,558,333 and 4,459,600 which disclose the construction that a heat-acting portion is arranged in a curved region, and an ejection system of an air-communication type described in Japanese Patent Registration No. 2962880, Japanese Patent Registration No. 3246949 and Japanese Patent Application Laid-Open No. H11-188870. In addition, the present invention is also effective on such a construction (for example, Japanese Patent Application Laid-Open No. S59-123670) that a slit common to a plurality of electrothermal converters is used as an ejection part of the electrothermal converters. Further, although a full-line type recording head having a length corresponding to the width of the greatest recording medium, on which recording can be conducted by the recording apparatus, may be either one of the construction that the length is met by such a combination of plural recording heads as disclosed in the above-described publications or the construction of one recording head integrally formed, the present invention can more effectively exhibit the above-described effects.

In addition, the present invention is effective even when a replaceable, chip type recording head, in which electrical connection to an apparatus body and the feed of an ink from the apparatus body become feasible by being installed in the apparatus body, or a cartridge type recording head provided integrally with a recording head itself, is used. Further, the addition of recovery means for a recording head, preliminary auxiliary means, etc. which are provided as constitution of the recording apparatus applied is preferred because the effects of the present invention can be more stabilized. Specifically describing these means, capping means for the recording head, cleaning means, pressurizing or sucking means, preliminary heating means by electrothermal converters, other heating elements than these or combinations thereof, and preliminary ejection mode that ejection separate from recording is conducted are included.

A recording apparatus according to the present invention is specifically described. As shown in FIG. 1 schematically illustrating a front of a printer, the recording apparatus is a recording apparatus comprising an ink tank portion 1 for containing the active energy ray curable aqueous ink according to the present invention, a head portion 2 (herein, using a multi-head composed of an array of a number of heads) for actually conducting recording, a lamp portion 3 for conducting irradiation of ultraviolet rays for curing, a driving portion 4 for driving the head portion and lamp portion and a paper discharge portion 5 for conveying a recording medium recorded. Incidentally, besides these portions, a wiping portion, a capping portion, a paper feed portion and a driving motor portion, which are not illustrated, are installed.

In FIG. 1, in the head portion 2, nozzle portions for ejecting an active energy ray curable aqueous ink are arranged laterally symmetrically as to each color, and the head portion 2 and lamp portion 3 are laterally scanned integrally with each other. After the active energy ray curable aqueous ink is applied to a recording medium, irradiation of active energy is immediately conducted (details of an ultraviolet lamp preferably used as the active energy will be described subsequently). When this recording apparatus is used, therefore, feathering of ink droplets on plain paper and bleeding between colors, and the like can be inhibited to provide an ink-jet recording method by which formation of high-quality and high-definition images can be realized.

In this embodiment, 4 inks of black (Bk), cyan (C), magenta (M) and yellow (Y) colors are arranged in the ink tank portion 1. In order to record higher-definition images, however, 6 inks of light cyan (LC) and light magenta (LM) in addition to the above inks may also be arranged. Since reactivity of black is poor, 3 inks of cyan, magenta and yellow colors which form a process black by a combination thereof may also be arranged. In the present invention, a material that can screen light is used as that of a tank.

Incidentally, besides the above-described recording system, a system that the lamp is arranged on the front of the paper discharge portion, a system that feeding and discharging of paper are conducted by winding the paper on a rotating drum, or a system that a drying portion is separately provided may be suitably selected.

<Ultraviolet Irradiation Lamp>

An ultraviolet irradiation lamp that is particularly preferably used in curing of the active energy ray curable aqueous ink in the present invention will hereinafter be described. As the ultraviolet irradiation lamp, is preferably used the so-called low pressure mercury lamp in which a vapor pressure of mercury is 1 to 10 Pa during lighting, a high pressure mercury lamp, a mercury lamp coated with a fluorescent material, or the like. An emission spectrum in an ultraviolet region of these mercury lamps is within a range of at most 450 nm, particularly from 184 nm to 450 nm and thus is suitable for causing the polymerizable material in the black or colored ink to efficiently react. Since a small-sized power source can be used even when the power source is installed in a printer, the mercury lamp is suitable even in this sense. As the mercury lamps, for example, a metal halide lamp, a high pressure mercury lamp, an extra-high pressure mercury lamp, a xenon flash lamp, a deep UV lamp, a lamp that a mercury lamp is exited electrodelessly from the outside using micro waves, an UV laser, etc. are practically used. Since the above-described range is included in the emission wavelength regions of these lamps, they may be fundamentally used so far as power source size, input intensity, lamp shape and the like are allowed. The power source is selected according to sensitivity of the catalyst used.

The necessary intensity of the ultraviolet rays is preferably about 500 to 5,000 mW/cm$^2$ from the viewpoint of the rate of polymerization. If the irradiation intensity is insufficient, the curing required for the present invention is not sufficiently achieved. If the irradiation intensity is too high on the other hand, in some cases, the printing base material may be damaged, or the fading of the colorant may be caused.

EXAMPLES

The present invention will hereinafter be described more specifically by the following Examples and Comparative Examples. However, the present invention is not limited by the following examples so far as not exceeding the gist of the present invention.

Examples 1 to 8

The respective components shown in the following Table 1 were mixed and thoroughly stirred into solutions. The resultant solutions were then filtered under pressure through a filter having a pore size of 0.50 μm, thereby respectively preparing inks according to EXAMPLES 1 to 8. Incidentally, all designations of "part" or "parts" in the ink components mean part or parts by mass unless expressly noted. The pH of each of the inks was adjusted with sodium hydroxide so as to finally give 8.5.

Comparative Examples 1 and 2

The respective components shown in the following Table 1 were mixed and thoroughly stirred into solutions. The resultant solutions were then filtered under pressure through a filter having a pore size of 0.50 μm, thereby respectively preparing inks according to COMPARATIVE EXAMPLES 1 and 2. Incidentally, all designations of "part" or "parts" in the ink components mean part or parts by mass unless expressly noted. The pH of each of the inks was adjusted with sodium hydroxide so as to finally give 8.5. As water-soluble polymerizable materials used in COMPARATIVE EXAMPLES, the following Exemplified Compounds 15 and 16 were used.

modified machine obtained by installing an UV lamp that a mercury lamp is exited electrodelessly from the outside using micro waves in the form adjoining the recording head portion in the same manner as illustrated in FIG. 1 in Ink-jet Printer Pixus 550i (manufactured by Canon Inc.) that is an

TABLE 1

Exemplified Compounds 15

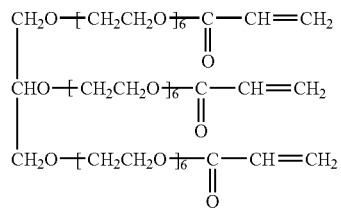

Exemplified Compounds 16

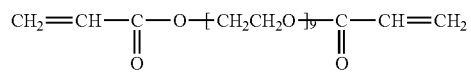

| | Amount incorporated (% by mass) | | | | | | | | | |
|---|---|---|---|---|---|---|---|---|---|---|
| | EX. 1 | EX. 2 | EX. 3 | EX. 4 | EX. 5 | EX. 6 | EX. 7 | EX. 8 | COMP. EX. 1 | COMP. EX. 2 |
| Colorant | | | | | | | | | | |
| Aqueous pigment dispersion of Pigment Blue 15:3 containing polymeric dispersant | 40 (4%)[1] | 40 (4%)[1] | 40 (4%)[1] | 40 (4%)[1] | 40 (4%)[1] | 40 (4%)[1] | 40 (4%)[1] | 40 (4%)[1] | 40 (4%)[1] | 40 (4%)[1] |
| Water-soluble polymerizable material | | | | | | | | | | |
| Exemplified Compound 1 | | | | 15 | | | | | | |
| Exemplified Compound 2 | | | | | | | | 5 | | |
| Exemplified Compound 3 | 15 | 15 | 20 | | | | | | | |
| Exemplified Compound 5 | | | | | 15 | | | 10 | | |
| Exemplified Compound 7 | | | | | | 20 | | | | |
| Exemplified Compound 8 | | | | | | | 20 | | | |
| Exemplified Compound 15 | | | | | | | | | 15 | |
| Exemplified Compound 16 | | | | | | | | | | 15 |
| Water-soluble polymerization initiator | | | | | | | | | | |
| Exemplified Compound 10 | 2 | 2 | 2 | 2 | 1 | 2 | 1 | 1.5 | 2 | |
| Exemplified Compound 11 | | | | | 1 | | | 0.5 | | 2 |
| Exemplified Compound 12 | | | | | | | 1 | | | |
| Diluent | | | | | | | | | | |
| Acryloylmorpholine | 5 | 5 | | 5 | 5 | | 5 | | 5 | 5 |
| Hydrogen donor | | | | | | | | | | |
| Triethanolamine | | | | | | | 3 | | | |
| pH adjustor | | | | | | | | | | |
| 0.2N aqueous sodium hydroxide | | | | Amount to give pH 8.5 to ink | | | | | | |
| Water | | | | | | | | | | |
| Ion-exchanged water | 78 | 38 | 38 | 38 | 38 | 38 | 35 | 38 | 38 | 38 |

[1] Pigment content.

<Evaluation of Ink>

The respective inks according to EXAMPLES 1 to 8 and COMPARATIVE EXAMPLES 1 and 2 were evaluated as to the following items (1), (2) and (3) in accordance with the following respective method and standards by means of a ink-jet apparatus having the On-Demand type multi-recording head that an ink is ejected by applying thermal energy to the ink according to recording signals. As the UV lamp, a D bulb was used. The intensity at an irradiation position is 1,500 mW/cm². Evaluation results obtained by using the inks according to EXAMPLES 1 to 8 and COMPARATIVE EXAMPLES 1 and 2 and measured values of their viscosities are shown collectively in Table 2.

(1) Curing Performance of Ink:

A prescribed ink was charged into the above-described printer to print a character pattern of 12 points on paper for PPC (product of Canon Inc.). With respect to the resultant print, the following evaluation was made. Incidentally, in the evaluation of the clear ink of Example 1, a character pattern of 12 point was printed with an ink composed of only an ordinary solvent system, which was not an active energy curable system, and containing a colorant just before (within 0.1 second) printing with the clear ink was conducted, and a character pattern of 12 point was then printed with the clear ink so as to overcoat the first-printed character pattern. The formulation of each of the ink containing a colorant is composed of 40% by mass (pigment concentration: 4% by mass) of an aqueous pigment dispersion of Pigment Blue 15:3 containing a polymeric dispersant, 5% by mass of glycerol, 10% by mass of diethylene glycol and 45% by mass of water.

(1-1) Fixability:

With respect to the above sample after 10 second from completion of the printing, whether or not stain was caused on a non-printed area (blank area) of the recording medium and on silbon paper due to rubbing on the printed area when the silbon paper was placed on the paper printed and then pulled up in a state that a weight having a load of 40 g/cm$^2$ (2) Long-Term Storability of Ink:

A prescribed ink was placed in a Teflon container and hermetically sealed. The ink provided in such a manner was stored for a month in ovens of ordinary temperature and 60° C. at a dark place. The average particle diameter of the pigment in the ink and the viscosity of the ink were measured before and after the storage to evaluate the ink as to the long-term storability in accordance with the following standard.

A: Rate of variation of the measured values after the storage to the initial values was lower than 10%;

B: Rate of variation of the measured values after the storage to the initial values was not lower than 10%, but lower than 30%;

C: A coefficient of variation of the measured values after the storage to the initial values was not lower than 30%.

(3) Ejection Stability:

A prescribed ink was charged into the above-described printer to continuously print ruled lines on 100 sheets of paper for PPC (product of Canon Inc.), thereby visually observing the line size and slippage thereof to evaluate the ink as to the ejection stability.

A: None of change in line size and slippage were observed;

B: The line was somewhat thinned, but the level thereof caused no problem;

C: The line was thinned, and slippage was somewhat observed.

TABLE 2

| | | | EX. 1 | EX. 2 | EX. 3 | EX. 4 | EX. 5 | EX. 6 | EX. 7 | EX. 8 | COMP. EX. 1 | COMP. EX. 2 |
|---|---|---|---|---|---|---|---|---|---|---|---|---|
| Viscosity (mPa · s at 25° C.) | | | 1.9 | 2.7 | 2.8 | 2.6 | 3.0 | 3.4 | 3.3 | 3.0 | 2.8 | 3.4 |
| 1. Curing performance of ink | Fixability | | A | A | A | A | A | A | A | A | A | B |
| | Marker resistance | | A | A | A | B | A | A | B | A | B | B |
| 2. Longterm storability of ink | Average particle diameter of pigment | Ordinary temp. | A | A | A | A | A | A | A | A | B | B |
| | | 60° C. | A | A | A | A | A | A | A | A | C | C |
| | Viscosity | Ordinary temp. | A | A | A | A | A | A | A | A | B | B |
| | | 60° C. | A | A | A | A | A | A | A | A | C | C |
| 3. Ejection stability | | | A | A | A | A | A | A | A | A | C | C | was placed on the recorded surface of the paper was visually observed to evaluate the ink as to the fixability in accordance with the following standard.

A: No stained area due to rubbing was observed;

B: A stained area due to rubbing was scarcely observed;

C: A stained area due to rubbing was conspicuous.

(1-2) Marker Resistance:

With respect to the above sample after 10 second from completion of the printing, a character-printed area was marked once under an ordinary writing pressure with Spot Writer Yellow that is a yellow fluorescent pen manufactured by Pilot Pen Co., Ltd., whereby whether damage of the characters was caused or not was visually observed to evaluate the ink as to the marker resistance in accordance with the following standard.

A: No damage of characters by the marker was caused;

B: Damage of characters by the marker was slightly caused;

C: Damage of characters by the marker was markedly caused.

This application claims priority from Japanese Patent Application No. 2004-092370 filed on Mar. 26, 2004, which is hereby incorporated by reference herein.

What is claimed is:

1. An active energy ray curable aqueous ink comprising at least water and a polymerizable material which is radically polymerized by an active energy ray, wherein the polymerizable material is a water-soluble polymerizable material represented by the following formula (I):

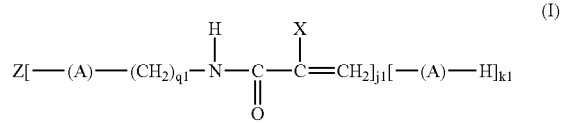

wherein Z is a residue of a polyol, j1 is an integer of 2 to 6, k1 is an integer of 0 to 2, j1+k1 is an integer of 2 to 6, q1 is an integer of 1 to 4, X is hydrogen or a methyl group, and (A) is any one group of groups represented by the following formulae (II) and (III), with the proviso that the formulae (II) and (III) are not simultaneously contained in the formula (I),

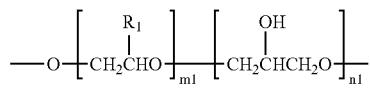
(II)

wherein m1 is an integer of 1 to 5, n1 is 0 or 1, and $R_1$ is hydrogen or a methyl group; and

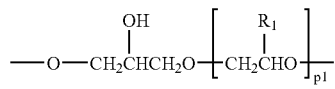
(III)

wherein p1 is an integer of 1 to 5, and $R_1$ is hydrogen or a methyl group.

2. The active energy ray curable aqueous ink according to claim 1, wherein the aqueous ink contains a water-soluble polymerization initiator that generates a radical due to an active energy ray.

3. The active energy ray curable aqueous ink according to claim 2, wherein the water-soluble polymerization initiator is at least one compound selected from the group consisting of the following formulae (IV) and (VI) to (IX)

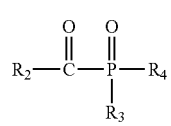
(IV)

wherein $R_2$ is an alkyl or phenyl group, $R_3$ is an alkyloxy or phenyl group, and $R_4$ is the following formula (V)

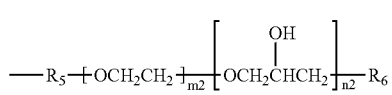
(V)

in which $R_5$ is $—[CH_2]_{x2}—$ (x2 being 0 or 1) or a phenylene group, m2 is an integer of 0 to 10, n2 is 0 or 1, $R_6$ is hydrogen, a sulfone, carboxyl or hydroxyl group, or a salt thereof;

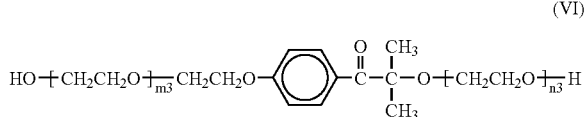
(VI)

wherein m3 is an integer of 1 or greater, n3 is an integer of 0 or greater, and m3+n3 is an integer of 1 to 8;

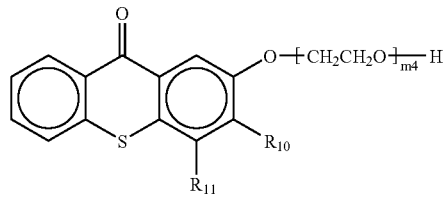
(VII)

wherein $R_{10}$ and $R_{11}$ are, independently of each other, hydrogen or an alkyl group, and m4 is an integer of 5 to 10;

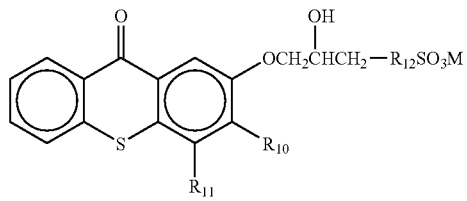
(VIII)

wherein $R_{10}$ and $R_{11}$ are, independently of each other, hydrogen or an alkyl group, $R_{12}$ is $—(CH_2)_x—$ (x being 0 or 1), $—O—(CH_2)_y—$ (y being 1 or 2) or a phenylene group, and M is hydrogen or an alkali metal; and

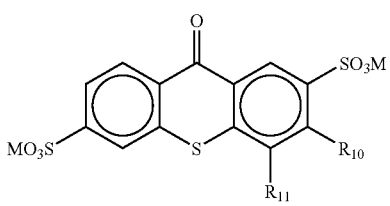
(IX)

wherein $R_{10}$ and $R_{11}$ are, independently of each other, hydrogen or an alkyl group, and M is hydrogen or an alkali metal.

4. The active energy ray curable aqueous ink according to claim 1, wherein the aqueous ink further contains a colorant.

5. An ink-jet recording process comprising the steps of ejecting the aqueous ink according to claim 1 on a recording medium and irradiating the recording medium, to which the aqueous ink has been applied, with an active energy ray to cure the aqueous ink.

6. The ink-jet recording process according to claim 5, wherein the aqueous ink is applied to the recording medium by causing thermal energy to act on the aqueous ink.

* * * * *